Patented Dec. 16, 1930

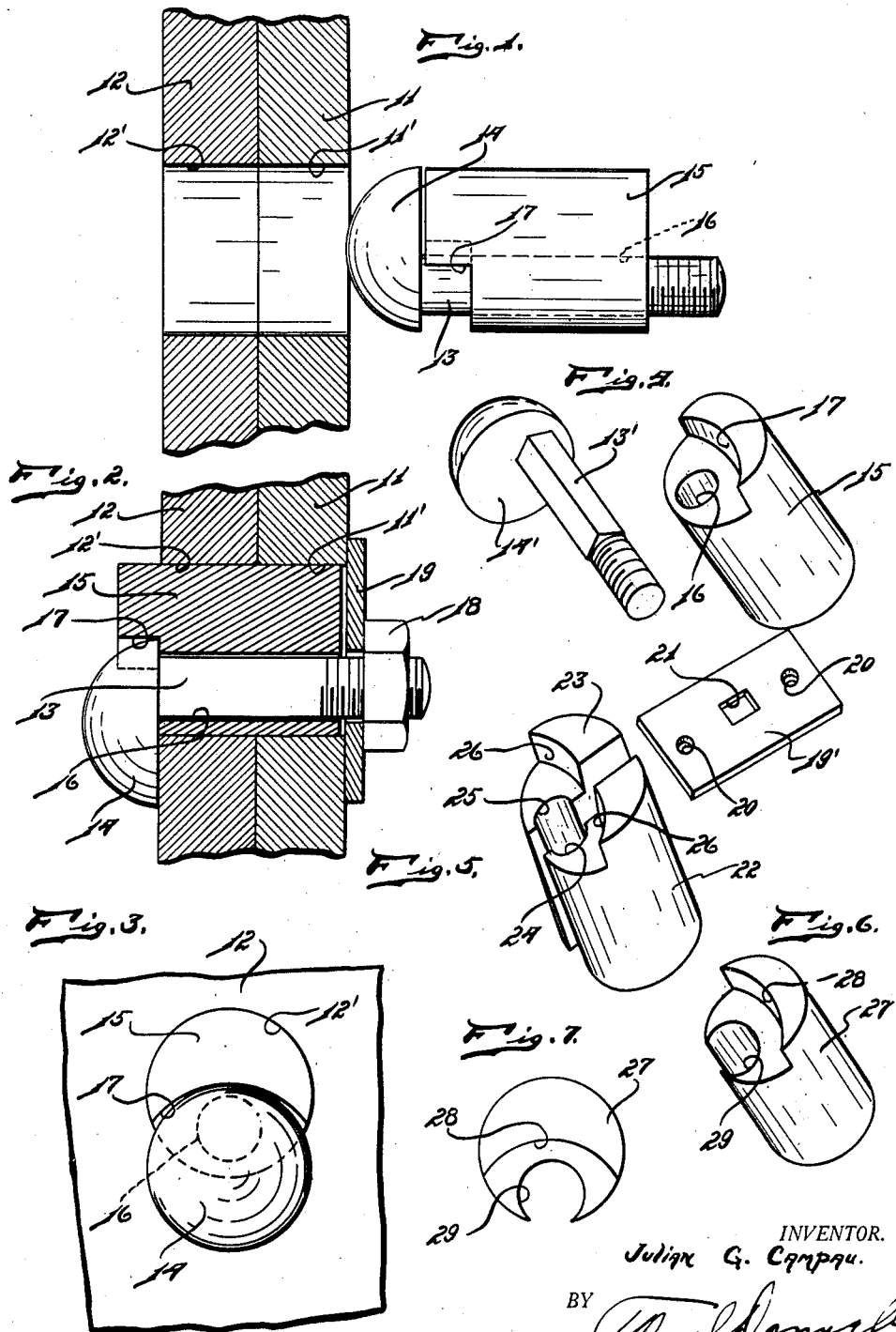

1,785,709

UNITED STATES PATENT OFFICE

JULIAN G. CAMPAU, OF MONROE, MICHIGAN, ASSIGNOR OF ONE-FOURTH TO HARRY BONIFACIO, OF MONROE, MICHIGAN; EMILIE J. CAMPAU ADMINISTRATRIX OF SAID JULIAN G. CAMPAU, DECEASED

BOLT AND BUSHING THEREFOR

Application filed April 14, 1930. Serial No. 444,016.

My invention relates to a new and useful improvement in a bolt and bushing therefor. The invention is primarily adapted for use where a pair of bodies are to be secured together by a bolt projecting through aligning openings in the bodies, in such instances where only one side of one of the bodies is accessible so that it would be impossible to insert the bolt from the side opposite to which the nut is operated upon. It is an object of the present invention to provide a bolt and co-operating parts so arranged and constructed that the bolt may be projected through the parts to be secured together from the same side at which the nut is to be operated upon while being threaded on the bolt.

Another object of the invention is the provision of a bolt in which a locking of the various parts in their operative position may be easily and quickly effected.

Another object of the invention is the provision of a bolt co-operating with a bushing through which the bolt is eccentrically projected so that when the bolt is turned on its axis after being projected through the openings of the bodies to be held together, the head will engage the inaccessible face of one of the bodies and serve to lock the bolt in operative position in the openings.

Another object of the invention is the provision of a bolt with a stem portion projecting eccentrically from one face of a head.

Another object of the invention is the provision of a bolt having the head eccentric and provided with means for retaining the bolt so rotated, when in operative position, as to maintain the head in non-alignment with the opening through which it is projected.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention also illustrating a section through the material to be bound together.

Fig. 2 is a central vertical sectional view of the invention showing it in operative position.

Fig. 3 is an end elevational view of the invention showing it in operative position.

Fig. 4 is a perspective view of a modified form of the invention showing the parts in separated relation.

Fig. 5 is a perspective view of a modified form of bushing.

Fig. 6 is a view of a modified form of the bushing used in the invention.

Fig. 7 is an end elevational view of Fig. 6.

In the form shown in Figs. 1, 2, and 3, the bodies 11 and 12, which are to be bound together, are provided with the openings 11' and 12', respectively, which are in alignment. When these bodies are so located that only one side is accessible and it is desired to secure these parts together, the invention lends itself admirably to the purpose. This invention comprises a bolt having the stem 13 projecting eccentrically from the head 14. A bushing or retainer 15 is provided with a bore 16 formed therein, this bore being eccentric to correspond with the eccentricity of the stem 13. When the stem 13 is turned to a certain position on its axis, the head 14 may be brought into registration with the retaining member or bushing 15. In use, this retainer or bushing 15 is constructed the same size as the openings 11' and 12' so that when inserted therein the retainer or bushing serves to fill these openings. When the bolt is to be inserted into the openings, the parts are arranged as shown in Fig. 1 and after insertion the stem 13 is turned 180 degrees on its axis so as to bring the head into position shown in Fig. 2, the head thus being brought out of alignment with the openings 11' and 12' and serving to lock the bolt against removal from the openings. One end of the bushing or retainer 15 is cut away, as at 17, to provide a recess or pocket in which the head 14 may engage so that when the parts are in the position shown in Fig. 2, and the nut 18 is threaded against the washer 19 so as to draw the head and washer 19 tightly against the parts 12 and 11, a relative movement of the head 14 and the bushing or retainer 15 is prevented. In this way the member 15 serves to retain the bolt in its operative position and prevent its undue movement to a position where it can be withdrawn from the openings 11' and 12'.

In the form shown in Fig. 4 the construction is as already described excepting that the stem 13' is formed with flat faces. A washer 19' is provided with openings 20 through which screws or other securing means may be projected to secure this washer on the face of the part 11. A flat faced opening 21 is formed in the washer 19' for reception of the flat faced portion 13' so that the bolt itself is prevented from rotating while the nut is being threaded thereon.

In Fig. 5 I have shown the retainer or bushing formed of two parts 22 and 23, each having a groove 24 and 25 which co-operate to form a bore for accommodating the stem of the bolt. Each section is cut away, as at 26, to provide the necessary recess for reception of the head 14.

In Figs. 6 and 7 I have shown a retainer or bushing 27 provided with the cut away portion 28 and having a longitudinally extending passage 29 breaking out through the periphery.

The utility of the invention is believed obvious from the description given of the various uses to which the invention would be adaptable and is believed to be readily apparent to a mechanic having need of such an invention.

While I have illustrated and described the preferred form of my invention, I do not wish to limit myself to the precise details of structure shown but desire to avail myself of such variations and modifications as may come within the scope of the appended claims.

Having thus described my invention, what I claim as new and desire to secure by Letters Patent is:

1. A bolt and retaining member of the class described, comprising: a bolt head; a stem projecting outwardly from one face of said head eccentrically thereof and having a threaded portion for the reception of a nut; an elongated retainer having a passage formed therein eccentrically thereof for the reception of said stem, said stem being rotatable in said passage, and said retainer having a portion of one face cut away to provide a recess for the reception of said head upon rotation of said stem to a predetermined position, the engagement of said head in said recess permitting axial movement of said stem in said passage so as to project said stem beyond said passage, a portion of said head in this position extending beyond the periphery of said retainer.

2. A device of the class described, comprising: a bolt head; a stem projecting from one face of said head eccentrically thereof and having a threaded portion for the reception of a nut; a retainer having a passage formed therein for the projection of said stem therethrough, said stem being rotatable in said passage, said head and said retainer being in peripheral alignment upon rotation of said stem to a predetermined position, said retainer having one side of one face cut away to provide a recess for the reception of said head upon the rotation of said stem to a predetermined position, said stem upon engagement of said head in said recess projecting further beyond said retainer and being non-rotatable in said passage.

3. A device of the class described, comprising: a cylindrical retaining member having an axially extended eccentric passage formed therein and having one end cut away at said passage to provide a recess; a bolt head of a diameter corresponding to the outside diameter of said retainer; a stem projected eccentrically from one face of said bolt head and rotatably positioned in said passage, said head and said retaining member being in peripheral alignment upon rotation of said stem to a predetermined position, and said head being engagable in said recess upon rotation of said stem to a predetermined position, said stem being non-rotatable upon engagement of said head in said recess.

4. A device of the class described, comprising: a cylindrical retaining member having an axially extended eccentric passage formed therein and having one end cut away at said passage to provide a recess; a bolt head of a diameter corresponding to the outside diameter of said retainer; a stem projected eccentrically from one face of said bolt head and rotatably positioned in said passage, said head and said retaining member being in peripheral alignment upon rotation of said stem to predetermined position, and said head being engageable in said recess upon rotation of said stem to a predetermined position, said stem being non-rotatable upon engagement of said head in said recess, said stem having flat faces; and a separable plate provided with a flat sided opening for projection of said stem therethrough.

In testimony whereof I have signed the foregoing specification.

JULIAN G. CAMPAU.